US011369084B1

(12) United States Patent
Theno

(10) Patent No.: US 11,369,084 B1
(45) Date of Patent: Jun. 28, 2022

(54) PET DEVICE

(71) Applicant: Bioesse Technologies, LLC, Minnetonka, MN (US)

(72) Inventor: Mark H Theno, Minnetonka, MN (US)

(73) Assignee: Bioesse Technologies, LLC, Minnetonka, MN (US)

( * ) Notice: Subject to any disclaimer, the term of this patent is extended or adjusted under 35 U.S.C. 154(b) by 194 days.

(21) Appl. No.: 16/889,313

(22) Filed: Jun. 1, 2020

(51) Int. Cl.
*A01K 15/00* (2006.01)
*A01K 13/00* (2006.01)

(52) U.S. Cl.
CPC ............ *A01K 15/00* (2013.01); *A01K 13/003* (2013.01)

(58) Field of Classification Search
CPC .... A01K 13/003; A01K 15/00; A01K 27/007; A61D 7/00; A61L 9/00–22
See application file for complete search history.

(56) References Cited

U.S. PATENT DOCUMENTS

| 1,732,028 | A | * | 10/1929 | Reiner | A01M 29/12 239/59 |
| 2,063,605 | A | * | 12/1936 | Janssens | G01F 11/12 222/364 |
| 2,808,030 | A | * | 10/1957 | Costanzo | A01K 27/007 119/860 |
| 5,422,078 | A | * | 6/1995 | Colon | A61L 9/12 239/57 |
| D444,599 | S | * | 7/2001 | Guerry, Jr. | D20/27 |
| 7,070,172 | B2 | * | 7/2006 | Fabrega | A01M 1/2044 261/104 |
| 9,278,151 | B2 | * | 3/2016 | Westphal | A61L 9/12 |
| 9,610,375 | B2 | * | 4/2017 | Zhang | A61L 9/12 |
| 2018/0352784 | A1 | * | 12/2018 | Theno | A01K 13/003 |
| 2021/0308314 | A1 | * | 10/2021 | Sedighi | A61L 9/12 |

* cited by examiner

*Primary Examiner* — Monica L Barlow
*Assistant Examiner* — Madeline L Douglas
(74) *Attorney, Agent, or Firm* — Schwegman Lundberg & Woessner, P.A.

(57) ABSTRACT

Disclosed is a pet device. The pet device can include a housing, a movable member, and a first porous element. The housing can include a back and a front connected to the back to define a cavity. The front can define a first opening. The moveable member can be located in between the back and front. The moveable member can include a tab and can define an element receptacle. The first porous element can be impregnated with a first fluid and sized to fit within the element receptacle. The movable member can be moveable between a first position where the element receptacle is located proximate the first opening and a second position where a majority of the moveable member, including the element receptacle, is located outside of the cavity.

12 Claims, 4 Drawing Sheets

PET DEVICE

TECHNICAL FIELD

Embodiments described generally herein relate to pet devices. Some embodiments relate to a device for dispensing a vapor proximate a pet.

BACKGROUND

Millions of Americans own animals as pets. To many, their pets are treated as members of the family. To that end, Americans spend billions of dollars a year on items for their pets. These items may include, special foods, toys, clothing, and furniture (e.g., monogramed dog beds).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
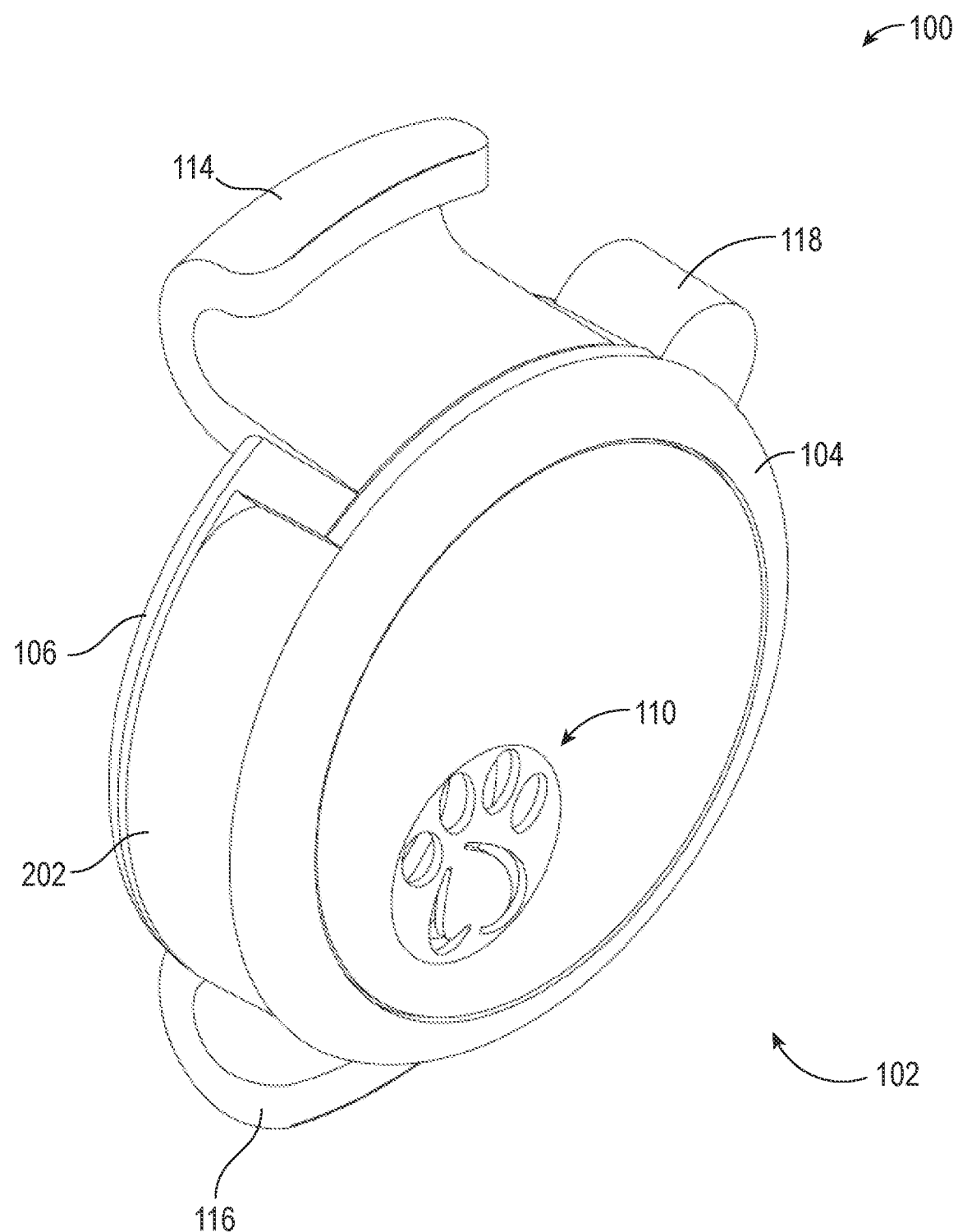
FIGS. 1A and 1B illustrate a pet device in accordance with embodiments disclosed herein.

Animals can experience anxiety, stress and depression. The anxiety, stress and depression can cause the animals to display physical symptoms of distress or behavior that may be destructive. For example, when an animal, such as a pet, is separated from its owner or another animal (e.g., a second pet, its mom, etc.) the animal may experience anxiety or depression. The anxiety or depression may cause the animal to display physical symptoms such as, but not limited to, loss of appetite and lethargic behavior. The anxiety or depression may also cause the animal to destroy furniture or other items around a house. Stress can be induced to the animal through putting them into a carrier (they may think it is a trip to the Vet), or just transporting them be it a dog, cat or horse, can induce stress.

As disclosed herein, various scents can be used to relieve anxiety and depression in pets. The scents can be delivered via devices attached to collars, bridals, or other articles attached to the pet. For example, the devices disclosed herein can attach to a collar of a dog or cat or a bridal of a horse.

The device may include a housing that defines a cavity. A porous element may be impregnated with one or more substances. The housing may also define a plurality of through holes that pass from an exterior surface of the housing to the cavity. The one or more substances may evaporate or otherwise emit an aroma. The aroma of the one or more substances may help to alleviate anxiety in the animal. For example, the porous element may be impregnated with a plant oil and sweat or other bodily fluids of a sibling or parent of the animal. The plant oil and other fluid may slowly evaporate from the porous element and be inhaled by the animal. Other substances that may be impregnated within the porous element include, but are not limited to, phystosterols (plant sterols), fatty acids, terpene hydrocarbons, monoterpene hydrocarbons, sesquiterpenes, carboxylic acids and their derivatives, sebum, tri-glycerides, and sapienic acid. In addition, the porous element may be impregnated with oxygenated compounds such as, but not limited to, phenols, alcohols, aldehydes, ketones, esters, lactones, coumarins, ethers, and oxides. Examples of alcohols include, but are not limited to, monoterpene alcohols, sesquiterpene alcohols, diols, and thiols.

In addition to oils or bodily fluids, medications also may be impregnated within the porous element. For example, the animal may have a sensitivity to airborne substances (e.g., pollen) and the medication impregnated within the porous element may be an antihistamine. Other examples of medications may include asthma medication.

The porous element may be changeable. For instance, the housing may allow access to the cavity so that the user can change the porous element when all of the impregnated material has been used up. In addition, the user may be able to change the porous element so that a different aroma is emitted. For instance, the porous element may be impregnated with a perfume. The owner may be able to change the perfume to suit his or her desires.

Figure 1B:
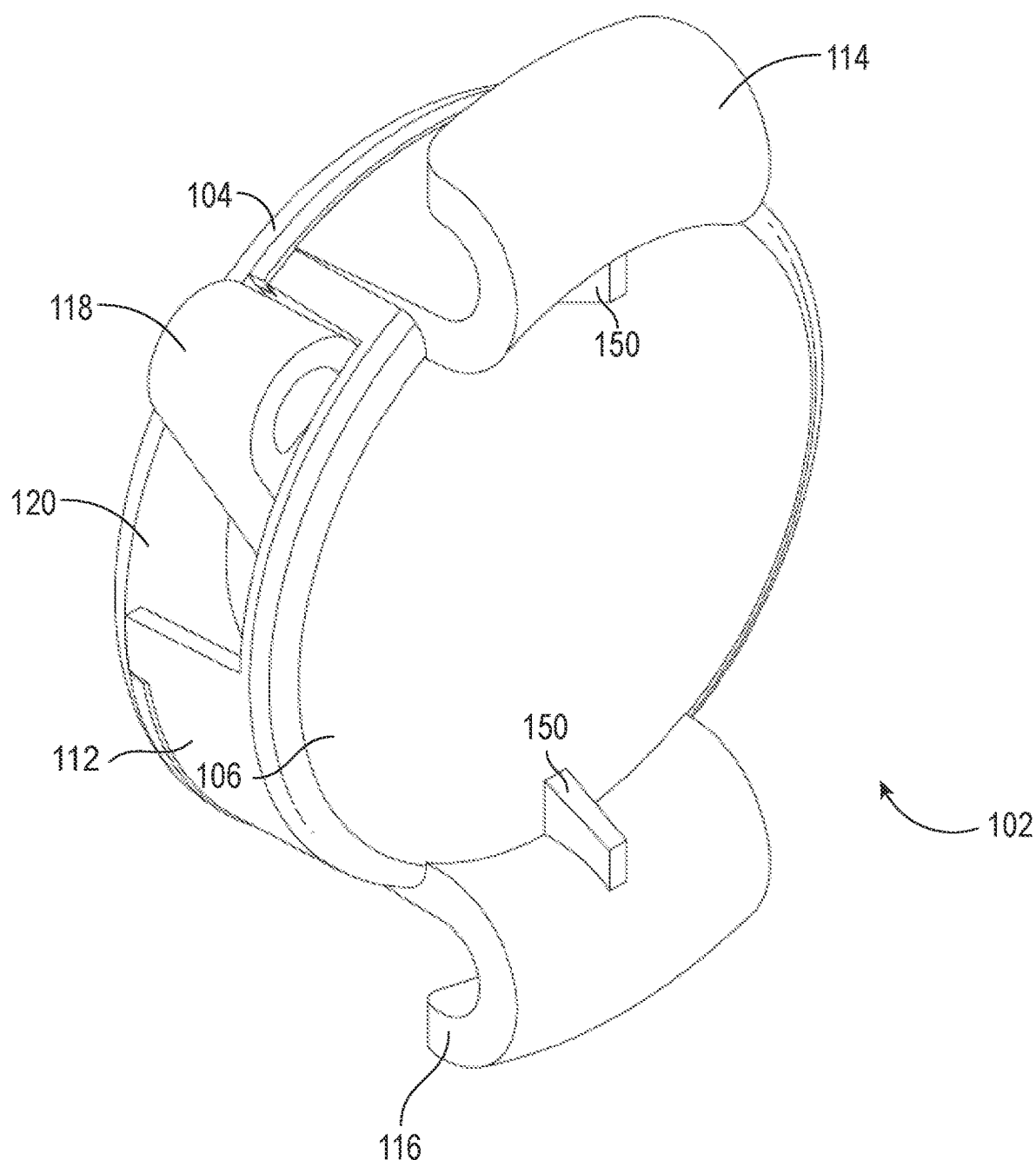
Figure 2:
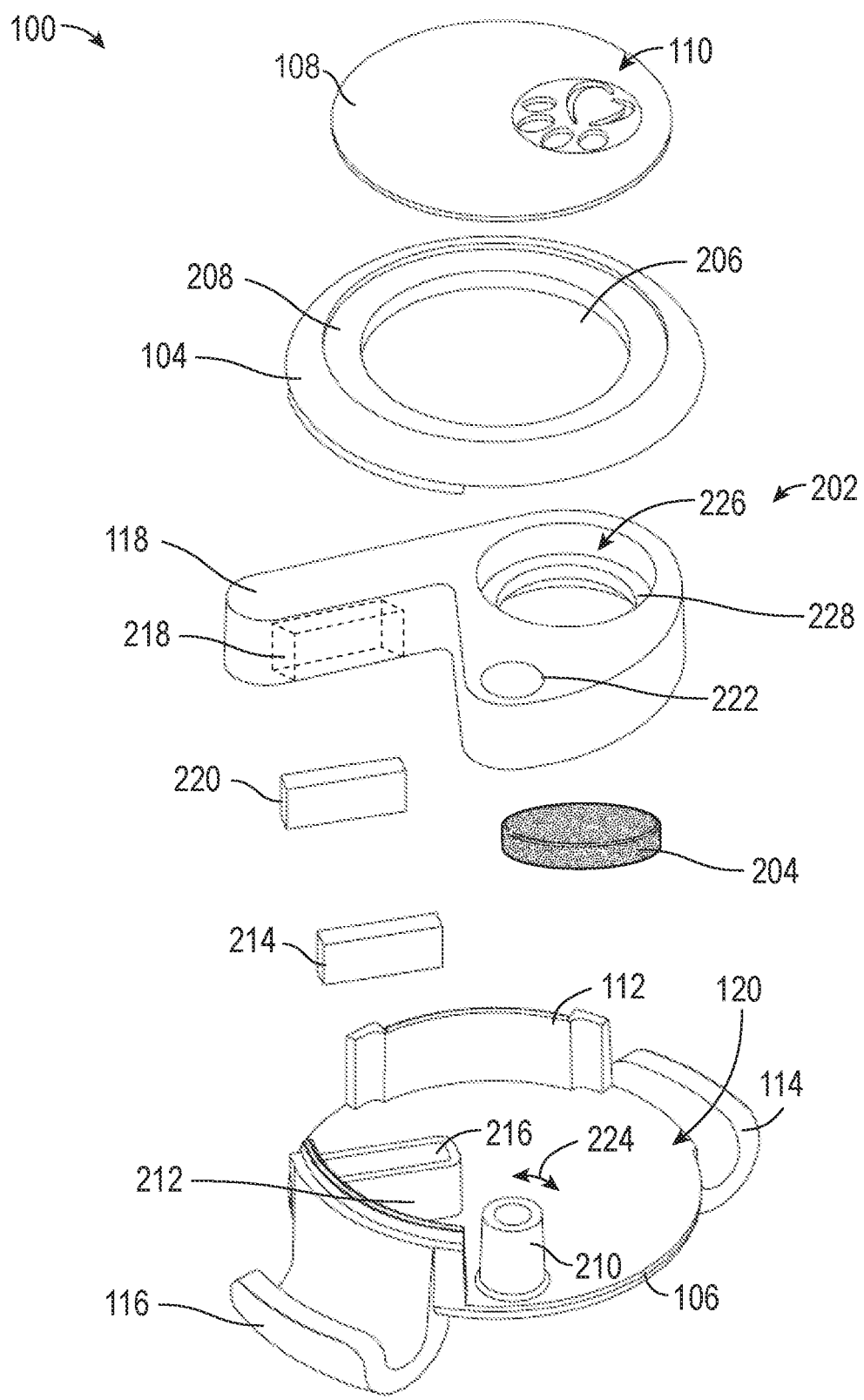
FIG. 2 illustrates an exploded assembly of a pet device in accordance with embodiments disclosed herein.

Turning now to the figures, FIGS. 1A, 1B, and 2 illustrate a pet device 100 in accordance with embodiments disclosed herein. As shown in FIGS. 1A, 1B, and 2, pet device 100 can include a housing 102, a moveable member 202, and a porous element 204. Housing 102 can be made of a front 104 and a back 106.

As shown in FIG. 2, front 104 can define an opening 206 and a recess 208. A plate 108. Plate 108 can define an opening 110. Opening 110 can be decorative as shown in FIGS. 1A and 2. For example, opening 110 can include multiple opening and can resemble a paw print as shown in FIGS. 1A and 2. Opening 110 can also resemble a dog bone, a mouse, or other ornamental shape.

Plate 108 can be permanently affixed to front 104 or it can be removeable. For example, plate 108 can be one of a plurality of plates that may be part of a kit and a user can select a desired plate from the plurality of plates. Each of the plurality of plates can be different colors and opening 110 can be different shapes for different for each of the plurality of plates.

Back 106 can include a sidewall 112. Back 106 can include a peg 210 and a magnet holder 212. A first magnet 214 can be installed into a pocket 216 defined by magnet holder 212. Back 106 can also define a first hook 114 and a second hook 116. First hook 114 and second hook 116 can be used to secure pet device 100 to a collar, harness, leash, or other item of a pet. One or more braces 150 can be used to provide support for first and second hooks 114, 116.

Moveable member 202 can include a tab 120. Tab 120 can define a pocket 218. A magnet 220 can be secured in pocket 218. Moveable member 202 can define a through hole 222. Through hole 222 can be sized to receive peg 210 such that moveable member 202 can pivot about peg 210 as indicated by arrow 224.

Moveable member 202 can define an element receptacle 226. Element receptacle 226 can include a ledge 228 that divides element receptacle 226 into two portions. During operation porous element 204 can be placed in element receptacle 226 and rest on ledge 228. In addition, a second porous element 204 can be placed in element receptacle 226.

Upon connecting front 104 to back 106, a cavity 120. Moveable member 202 can rotate about peg 210 into and out of cavity 120. For example, movable member 202 can be moveable between a first position and a second position. In the first position, element receptacle 226 can be located proximate opening 110 defined by plate 108. In the second position a majority of moveable member 202, including element receptacle 226, can located outside of cavity 120 so that porous element 204 can be installed or removed.

When in the first position, tab 118 can be located proximate magnet holder 212. By having tab 118 and magnet 220 proximate magnet holder 212 and magnet 214, the two magnets can be attacked to one another so as to hold moveable member 202 in the first position.

Porous element 204 can be sized to administer a specific dosage over a specific time. For instance, a porous element of a first size may deliver a dosage of W mg over X hours. A porous element of a second size may deliver a dosage of Y mg over Z hours.

As disclosed herein, element receptacle 226 can be divided by ledge 228. The division can allow the user to put multiple porous elements inside element receptacle 226. In addition, the division can allow the user to store additional porous elements in element receptacle 226. For example, a first porous element may be located proximate opening 110 and a second porous element may be located proximate back 106. The second porous element may be in a sealed wrapper to inhibit the substance impregnated within the second porous element from evaporating until the user unwraps it.

Pet device 100 can be manufactured from a metal, polymer, ceramic, or any combination thereof. For example, plate 108 can be a metal that is stamped and front 104, moveable member 202, and back 106 can be manufactured from a polymer via injection molding. Housing 102 and plate 108 can also be made of a metal via machining on a CNC machine.

Porous element 204 can be made of a ceramic or polymer. Porous element 204 can define a plurality of pores 224. Pores 224 can have a diameter that ranges from about 60 to about 90 microns. The size of pores 224 can control the rate of evaporation. For example, a pore of size X may allow for faster evaporation than a pore of size Y, where X is greater than Y. Stated another way, the pore size may affect evaporation rate by affecting the diffusion of the material in the pores into the atmosphere. For example, assuming a cylindrical pore and using Fick's Law, the time for the substance to evaporate from a pore may be:

$$t = \frac{\rho_w L^2}{2D\rho_s(1-f)}$$

where t=time, $\rho_w$=the density of the substance, L is the length of the pore, D=the diameter of the pore, $\rho_s$=the saturation density of the substance, and f=relative humidity.

As disclosed herein, the substance impregnated within porous element 204 can be a medication, an oil such as an essential oil or plant oil, a body fluid, such a sweat from a parent or sibling, etc.

Pet device 100 disclosed herein can be part of a system. The system can include a plurality of porous elements. The plurality of porous elements may be part of a blister pack of porous elements. Each of the porous elements in the blister pack may be the same or may be different. For example, each of the porous elements may include the same oil that may relieve anxiety within an animal. Alternatively, each of the porous elements may include a different oil or other substances in the same or different dosages.

During manufacturing, the porous elements may be place in a front portion of the blister pack. The substance to be impregnated within the porous elements may be diluted with a substance (e.g., an alcohol). The diluted substance may be allowed to soak into or otherwise impregnate the porous elements. Once the substance has been impregnated with the substance, the dilution agent (e.g., the alcohol) can be flashed off. Stated another way, once the substance has been impregnated into the porous elements, the dilution agent can be heated above its vaporization temperature and boiled off. Thus, the dilution agent should be selected such that it has a vaporization temperature that is significantly below the vaporization temperature of the substance to be impregnated into the porous elements. In addition, the dilution agent should not form an azeotrope with the substance.

The system may also include one or more applicators. The applicators may be used to collect a second substance that is to be impregnated into the porous element. For example, the applicators may be alcohol swabs. A pet owner may use the alcohol swabs to collect a sample of a body fluid such as sweat or other oils that can be collected from the skin. The alcohol may act as a dilution agent. Thus, once the body fluid has been absorbed by the porous element, the alcohol may evaporate as described above leaving the body fluid in the pores of the porous element.

Figure 3:
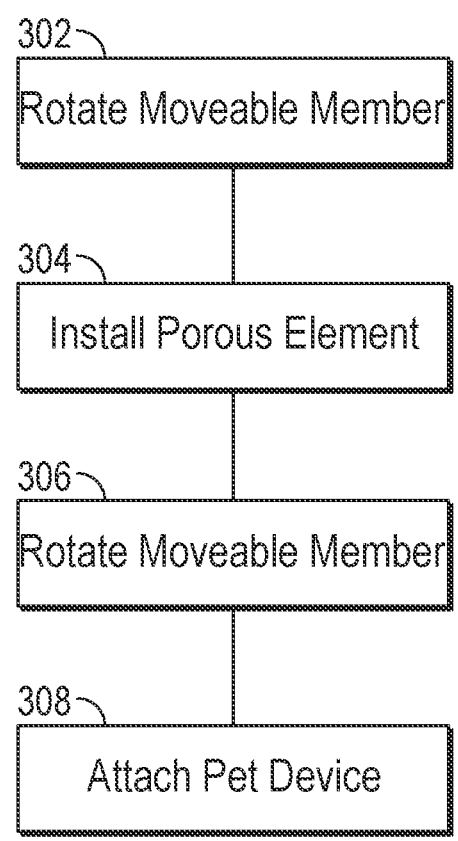
FIG. 3 illustrates a method in accordance with embodiments disclosed herein.

FIG. 3 illustrates a method 300 for providing aroma therapy to a pet in accordance with embodiments disclosed herein. The method 300 may begin at stage 302 moveable member 202 can be rotated from a first position where element receptacle 226 is located proximate opening 110 to a second position. At stage 304, porous element 204 can be installed in element receptable 226. As disclosed herein, porous element 204 can include a first substance, such as oil, medicine, or other substances as disclosed herein.

At stage 306, moveable member 202 can be rotated from the second position where a majority of moveable member 202, including element receptacle 226, is located outside of cavity 120 to the first position. After stage 306, pet device 100 can be attached to a pet. While attached to the pet, the first substance can evaporate from porous element 204 and be inhaled by the pet.

NOTES AND EXAMPLES

The following, non-limiting examples, detail certain aspects of the present subject matter to solve the challenges and provide the benefits discussed herein, among others.

Example 1 is a pet device comprising: a housing that includes a back and a front connected to the back to define a cavity, the front defining a first opening; a moveable member located in between the back and front, the moveable member including a tab, the moveable member defining an element receptacle; and a first porous element impregnated with a first fluid and sized to fit within the element receptacle, wherein the movable member is moveable between a first position where the element receptacle is located proximate the first opening defined by the front and a second position where a majority of the moveable member, including the element receptacle, is located outside of the cavity formed by the front and back.

In Example 2, the subject matter of Example 1 optionally includes a first magnet and a second magnet, the tab defining a first pocket and the back defining a second pocket, the first magnet located in the first pocket and the second magnet located in the second pocket.

In Example 3, the subject matter of any one or more of Examples 1-2 optionally include wherein the back defines a peg and the moveable member defines a through hole sized to receive the peg.

In Example 4, the subject matter of any one or more of Examples 1-3 optionally include wherein the movable member is pivotably connect to the housing.

In Example 5, the subject matter of any one or more of Examples 1-4 optionally include wherein the back defines one or more hooks.

In Example 6, the subject matter of any one or more of Examples 1-5 optionally include wherein the front includes a plate, the plate defining the first opening.

In Example 7, the subject matter of Example 6 optionally includes wherein the plate is one of a plurality of plates, each of the plates defining a different first opening having a different size.

In Example 8, the subject matter of any one or more of Examples 1-7 optionally include wherein the first porous element is impregnated with a second fluid.

In Example 9, the subject matter of any one or more of Examples 1-8 optionally include wherein the first opening has an ornamental shape.

In Example 10, the subject matter of any one or more of Examples 1-9 optionally include a second porous element sized to fit into the element receptacle and impregnated with a second fluid.

In Example 11, the subject matter of Example 10 optionally includes wherein the first fluid is an oil and the second fluid is a medication or a bodily fluid of an owner.

In Example 12, the subject matter of any one or more of Examples 1-11 optionally include wherein the first fluid is an oil, a medication, or a bodily fluid of an owner.

Example 13 is a system for providing aroma therapy to a pet, the system comprising: a housing that includes a back and a front connected to the back to define a cavity, first pocket, and a second pocket, the front defining a first opening; a moveable member pivotably connect to the housing via a through hole defined by the moveable member and a peg located in the cavity, the moveable member including a tab, the moveable member defining an element receptacle; a first magnet located in the first pocket; a second magnet located in the second pocket; a plurality of porous elements impregnated with a first fluid, each of the porous elements sized to fit within the element receptacle; and an applicator for depositing a second fluid onto a surface of at least one of the plurality of porous elements, wherein the movable member is moveable between a first position where the element receptacle is located proximate the first opening defined by the front and a second position where a majority of the moveable member, including the element receptacle, is located outside of the cavity formed by the front and back.

In Example 14, the subject matter of Example 13 optionally includes wherein the first fluid includes an oil.

In Example 15, the subject matter of any one or more of Examples 13-14 optionally include wherein the first fluid includes a medication.

In Example 16, the subject matter of any one or more of Examples 13-15 optionally include wherein the second fluid includes an alcohol.

In Example 17, the subject matter of any one or more of Examples 13-16 optionally include wherein the housing further defining a first and second hooks for attaching the housing to a pet.

Example 18 is a method for providing aroma therapy to a pet, the method comprising: rotating a moveable member from a first position where an element receptacle defined by the moveable member of a pet device is located proximate a first opening defined by a housing of the pet device to a second position; installing a porous element in the element receptable, the porous element including a first substance; rotating the moveable member from the second position where a majority of the moveable member, including the element receptacle, is located outside of the cavity to the first position, wherein in the first position, a first magnet located within the moveable member is located proximate a second magnet located within a portion of the housing of the pet device to secure the moveable member in the first position; and attaching the housing to a pet, wherein while attached to the pet, the first substance evaporates from the porous element and is inhaled by the pet.

In Example 19, the subject matter of Example 18 optionally includes wherein the first substance is a medication.

In Example 20, the subject matter of any one or more of Examples 18-19 optionally include impregnating the porous element with a second substance prior to installing the porous element in the housing.

In Example 21, the apparatuses or method of any one or any combination of Examples 1-20 can optionally be configured such that all elements or options recited are available to use or select from.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A system for providing aroma therapy to a pet, the system comprising:
   a housing that includes a back and a front connected to the back to define a cavity, a first pocket, and a second pocket, the front defining a first opening;
   a moveable member pivotably connected to the housing via a through hole defined by the moveable member and a peg located in the cavity, the moveable member including a tab, the moveable member defining an element receptacle;
   a first magnet located in the first pocket;
   a second magnet located in the second pocket;
   a plurality of porous elements impregnated with a first fluid, each of the porous elements sized to fit within the element receptacle; and
   an applicator for depositing a second fluid onto a surface of at least one of the plurality of porous elements,
   wherein the movable member is moveable between a first position where the element receptacle is located proximate the first opening defined by the front and a second position where a majority of the moveable member, including the element receptacle, is located outside of the cavity formed by the front and back.

2. The pet device of claim 1, wherein the front includes a plate, the plate defining the first opening.

3. The pet device of claim 2, wherein the plate is one of a plurality of plates, each of the plates defining a different first opening having a different size.

4. The pet device of claim 1, wherein the first opening has an ornamental shape.

5. The pet device of claim 1, wherein the first fluid is a bodily fluid of an owner.

6. The system of claim 1, wherein the first fluid includes an oil.

7. The system of claim 1, wherein the first fluid includes a medication.

8. The system of claim 1, wherein the second fluid includes an alcohol.

9. The system of claim 1, wherein the housing further defines a first hook and a second hook for attaching the housing to a pet.

10. A method for providing aroma therapy to a pet, the method comprising:
    rotating a moveable member from a first position where an element receptacle defined by the moveable member of a pet device is located proximate a first opening defined by a housing of the pet device to a second position;
    installing a porous element in the element receptable, the porous element including a first substance;
    rotating the moveable member from the second position where a majority of the moveable member, including the element receptacle, is located outside of the cavity to the first position, wherein in the first position, a first magnet located within the moveable member is located proximate a second magnet located within a portion of the housing of the pet device to secure the moveable member in the first position; and
    attaching the housing to a pet, wherein while attached to the pet, the first substance evaporates from the porous element and is inhaled by the pet.

11. The method of claim 10, wherein the first substance is a medication.

12. The method of claim 10, further comprising impregnating the porous element with a second substance prior to installing the porous element in the housing.

* * * * *